United States Patent [19]
Smith

[11] 3,855,511
[45] Dec. 17, 1974

[54] TRACTION MOTOR CONTROLLER CIRCUIT AND METHOD

[75] Inventor: Stephen Hagar Smith, San Pedro, Calif.

[73] Assignee: McCulloch Corporation, Los Angeles, Calif.

[22] Filed: July 11, 1973

[21] Appl. No.: 378,044

[52] U.S. Cl. ............... 318/317, 318/332, 318/341, 318/345
[51] Int. Cl. ............................................. H02p 7/00
[58] Field of Search ........... 318/139, 317, 331, 341, 318/345, 332

[56] References Cited
UNITED STATES PATENTS
3,586,948  6/1971  Broome .................... 318/332 X

*Primary Examiner*—G. Z. Rubinson
*Attorney, Agent, or Firm*—Burns, Doane, Swecker & Mathis

[57] ABSTRACT

A traction motor controller circuit and method in which the electronic switch supplying current to the motor is controlled as a function of load current between selected maximum and minimum limits. A manually variable throttle signal is compared with the sum of a signal related to motor current and a feedback signal from the comparator to act as a Schmitt trigger circuit in controlling the conduction of the electronic switch supplying current to the motor.

11 Claims, 7 Drawing Figures

PATENTED DEC 17 1974　　　　　　　　3,855,511

3,855,511
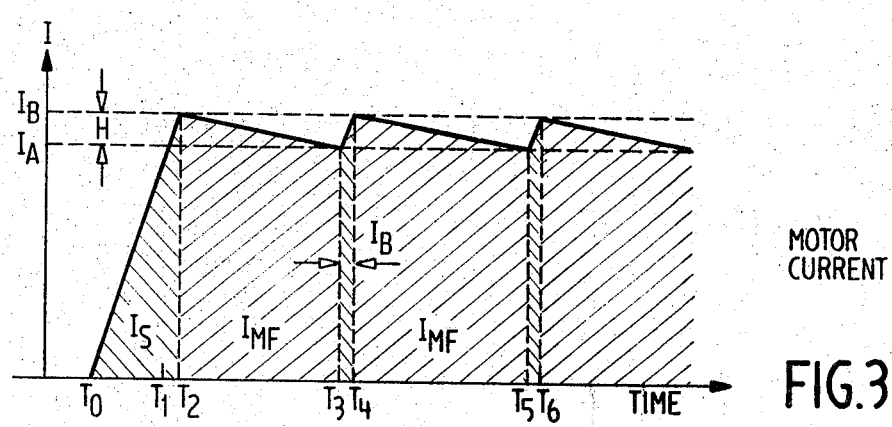
FIG.3 MOTOR CURRENT
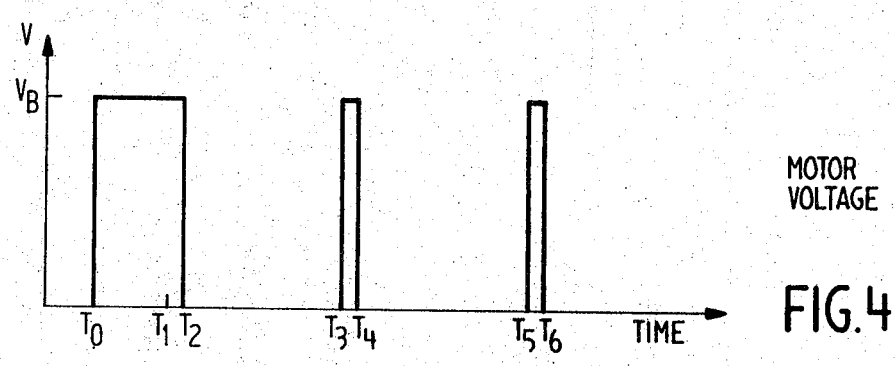
FIG.4 MOTOR VOLTAGE
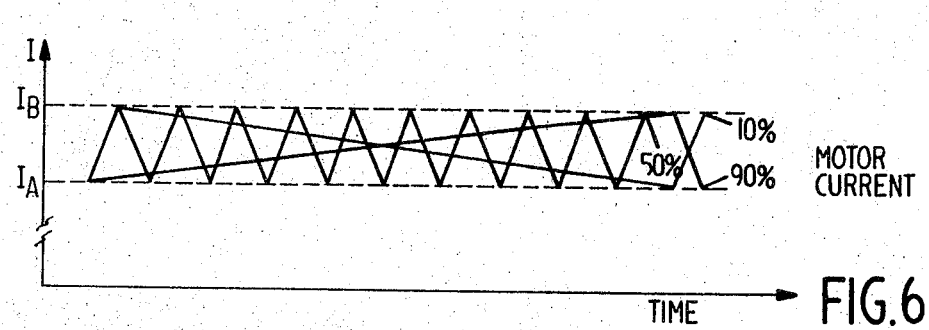
FIG.6 MOTOR CURRENT
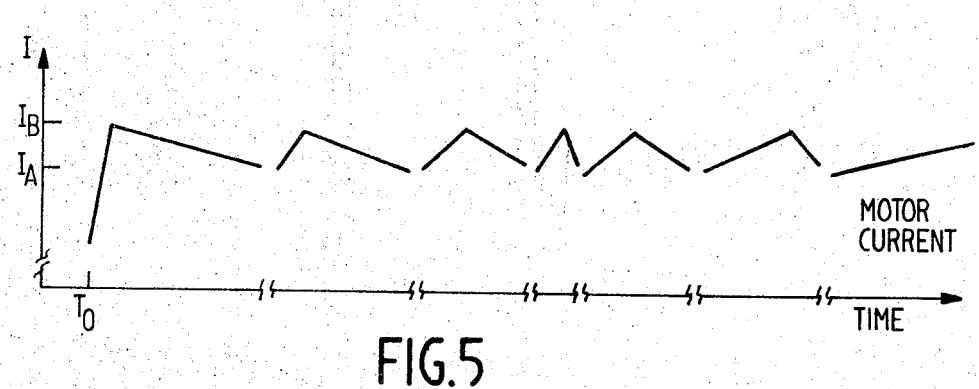
FIG.5 MOTOR CURRENT

TRACTION MOTOR CONTROLLER CIRCUIT AND METHOD

BACKGROUND OF THE INVENTION

This invention relates to a motor controller circuit for a traction vehicle such as an electric bicycle. Such vehicles generally include a direct current or universal motor and are commonly driven by direct current from a battery carried by the vehicle.

The speed of the vehicle may be controlled by controlling the conduction of an electronic switch between a fully on and fully off condition. In this method of control, pulses from an oscillator are applied to the control electrode of the electronic switch to thereby vary the period of conduction or duty cycle thereof. Controllers of this type suffer from a material disadvantage in that the electronic switch must absorb peak power each time the switch is operated.

At low motor speeds where the motor current is ordinarily high because of the torque requirements, it is desired to keep the switching losses low by switching at a relatively low frequency. However, as the motor speed increases, less torque and thus less current is required and the switching losses are thus reduced. Switching at a low frequency, however, produces an undesirable ripple or surging in the motor current.

Should the frequency of switching be increased to reduce the ripple effect of the load current, the increased switching under high torque conditions results in excessive power losses.

Another type of controller for traction vehicles is a resistance controller in which resistances of various values are selectively switched into and out of the circuit to reduce the application of current to the traction vehicle motor. Controllers of this type are incapable of achieving the effective current multiplication of a chopper controller which results from use of the back e.m.f. of the motor. In addition, there are substantial heat losses associated with current limiting resistors under high torque conditions.

It is accordingly an object of the present invention to obviate the disadvantages of known motor controller circuits and to provide a novel method and traction motor controller circuit.

It is another object of the present invention to provide a novel method and traction motor controller circuit in which conduction of the switch between the current source and the motor is controlled as a function of load current between maximum and minimum limits.

It is still another object of the present invention to provide a novel method and traction motor controller circuit operable without an oscillator and the attendant complex circuitry.

It is yet another object of the present invention to provide a novel method and traction motor controller circuit in which the current out of the battery is a selected constant and in which current multiplication is achieved.

A further object of the present invention is to provide a novel method and traction motor controller circuit operable at 100 percent duty cycle at any load short of an overload condition.

A still further object of the present invention is to provide a novel method and traction motor controller circuit in which a direct current voltage is intermittently applied to the motor at a duty cycle related to motor load.

These and many other objects of the present invention will become apparent to one skilled in the art to which the invention pertains from a perusal of the following detailed description when read in conjunction with the appended drawings.

THE DRAWINGS

FIG. 3 is a timing diagram of motor current;

FIG. 4 is a timing diagram of motor voltage;

FIG. 5 is a segmented graph illustrating changes in the shape of the motor current waveform over a relatively long period of time;

FIG. 6 is a graph of three motor current waveforms illustrating the variations at 10, 50 and 90 percent duty cycle; and, FIG. 7 is a more detailed schematic circuit diagram of one embodiment of the controller circuit of FIG. 1.

THE DETAILED DESCRIPTION

Figure 1:
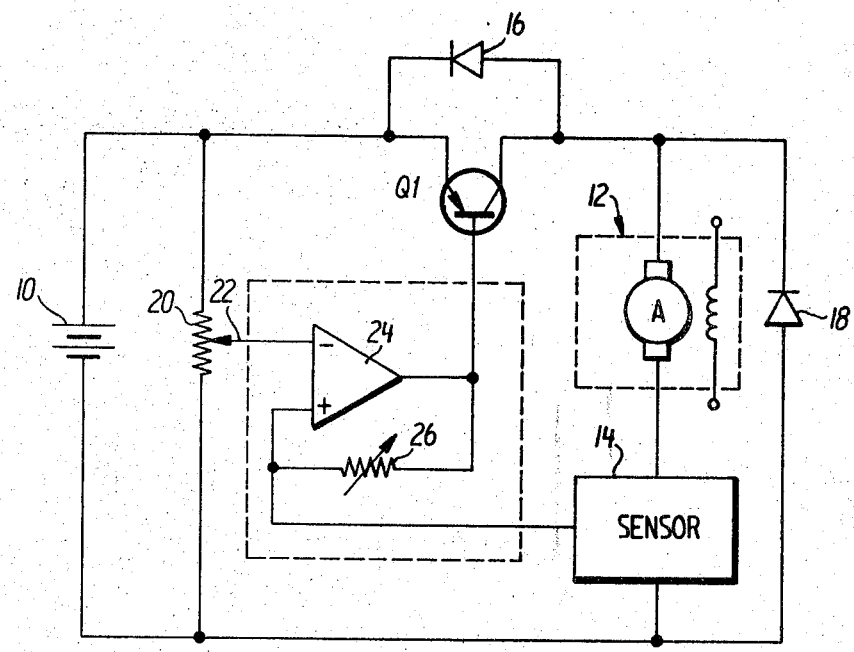
FIG. 1 is a schematic circuit diagram of the controller circuit of the present invention.

With reference to FIG. 1, a suitable conventional source of direct current such as a lead and battery 10 is connected in series with a PNP transistor Q1, the armature windings of a direct current motor 12, and a suitable conventional motor current sensor 14. A diode 16 is connected in parallel with the emitter-collector path of the transistor Q1 and a second diode 18 is connected in parallel with the series connected motor 12 and sensor 14.

A potentiometer 20 is connected in parallel across the battery 10 and the variable tap 22 thereof connected to the inverting or negative input terminal of a suitable conventional operation amplifier or comparator 24. The sensor 14 is connected to the noninverting or positive input terminal of the comparator 24 and the output signal from the comparator 24 is applied through a variable resistor 26 to the noninverting input terminal as well as to the base electrode of the transistor Q1.

In operation, the comparator 24 with the variable resistor 26 in the feedback path thereof functions as a Schmitt trigger circuit 28. With the tap 22 of the potentiometer 20 selectively adjusted as a throttle control for the motor 12, the Schmitt trigger circuit 28 operates as a pulse generator to control the conduction of the transistor Q1 and thus the application of current from the battery 10 to the series field and armature windings of the motor 12. With the transistor Q1 conducting, the motor current increases at a rate (di/dt) determined by E/L. A voltage related to the motor current detected by the sensor 14 is combined with the regenerative feedback signal from the comparator 24 to remove the base current from transistor Q1 thereby interrupting the application of current to the motor 12 when the reference voltage selected by the position of the tap 22 of the potentiometer 20 is exceeded.

Figure 2:
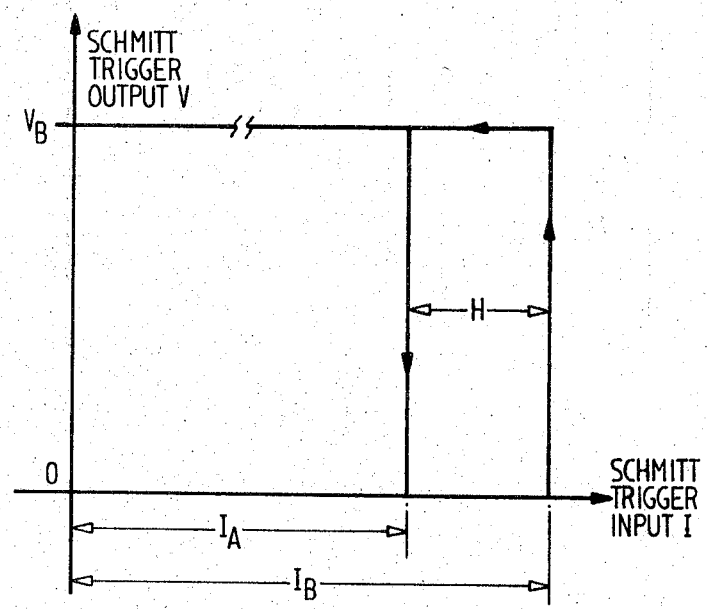
FIG. 2 is a graph of the output voltage of the Schmitt trigger circuit of FIG. 1 with respect to the input current applied thereto illustrating the hysteresis effect.

As is illustrated in FIG. 2, the output voltage of the Schmitt trigger circuit 28 of FIG. 1 is a function of the motor current as detected by the sensor 14 to provide a hysteresis waveform. As illustrated, the voltage varies between 0 and the battery voltage $V_B$ and the current varies between a selected throttle input current $1_A$ as determined by the position of the tap 22 of the potentiometer 20 and a value $I_B$ related to the resistance value of the variable resistor 26 in the feedback path of the comparator 24. The average motor current, i.e., the Schmitt trigger input current as sensed by the sensor 14, may be viewed as the throttle setting of the potentiometer 20 plus one-half of the hysteresis value as determined by the feedback resistor 26 of the comparator 24 or $I_A + I_B/2$.

With reference now to the timing diagram of FIG. 3, the motor current $I_S$ from the source 10 is illustrated as varying from a value 0 at time $T_0$ through a value $I_A$ related to the throttle setting at time $T_1$ to a value $I_B$ at time $T_2$. As illustrated in the timing diagram of FIG. 4, the voltage applied to the motor is the battery voltage, a constant value $V_B$. This voltage drops to 0 upon the cutoff of the transistor Q1 of the circuit of FIG. 1 at time $T_2$ and remains 0 until the transistor Q1 is again driven into saturation at time $T_3$ by the comparator 24.

As illustrated in FIG. 3, the motor current during this $T_2$–$T_3$ time interval drops from the value $I_B$ to the value $I_A$. This current $I_{MF}$ is induced by the collapsing magnetic field within the motor 12. The rate of collapse is proportional to $di/dt$ and is determined by the voltage drop cross the commutating diode 18, the back e.m.f. of the motor and the motor inductance (L).

The conduction of the transistor Q1 from time $T_3$ to time $T_4$ again applies the load voltage $V_B$ to the motor 12 and the motor current again increases from the selected value $I_A$ to the value $I_B$ during this time interval.

As earlier explained, the value of motor current $I_A$ is determined by the throttle setting and the value $I_B$ is determined by the value of the feedback resistor 26 of the comparator 24. The slope of the motor current curve between time $T_0$ and time $T_2$, between time $T_3$ and time $T_4$ and between time $T_5$ and time $T_6$ of FIG. 3 is a function of the battery voltage $V_B$ less the back e.m.f. of the motor. The slope of the motor current curve between time $T_2$ and time $T_3$, between time $T_4$ and time $T_5$, etc. is a result of the back e.m.f. plus the drop across the commutating diode 18 of the circuit of FIG. 1.

As is illustrated in the segmented waveform of FIG. 5, the slope of the motor current curve over a long time period varies as a function of motor speed. The portions of the curve of FIG. 5 reflecting 10, 50 and 90 percent speed as duty cycles are superimposed in FIG. 6 to illustrate the relative slope of the motor current curve between the values of $I_B$ and $I_A$ as the traction vehicle increases speed.

Figure 7:
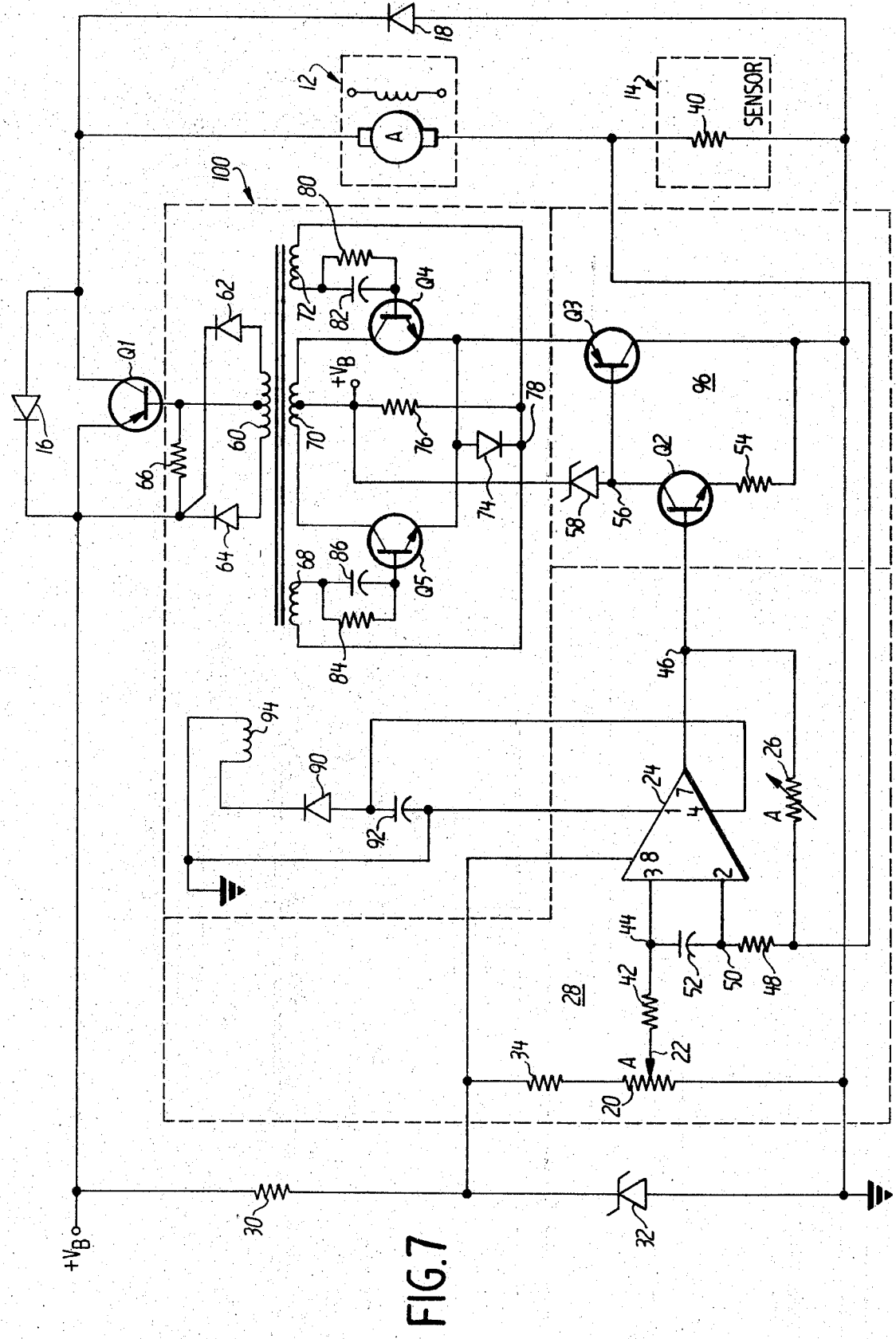

With reference now to the more detailed circuit diagram of FIG. 7 where like elements of the circuit of FIG. 1 are accorded like numerical designations, the battery voltage $V_B$ is applied across a voltage divider network which comprises a resistor 30, a resistor 34 and a potentiometer 20. A Zener diode 32 is connected in parallel with the resistor 34 and the potentiometer 20.

The battery voltage $V_B$ is also applied to the series connected PNP transistor Q1, the armature windings of the motor 12 and a resistor 40 which serves as the sensor 14 earlier described in connection with the circuit of FIG. 1. The commutating diode 18 may be connected across the series connected motor 12 and the resistor 40 and a second diode 16 connected in parallel with the emitter-collector path of the transistor Q1 as earlier described.

With continued reference to FIG. 7, the tap 22 of the potentiometer 20 is connected through a resistor 42 to the inverting input terminal 44 of a suitable conventional operation amplifier or comparator circuit such as the Motorola MC 1710 or the Fairchild 710, or equivalent. The output terminal 46 of the comparator 24 is connected through a variable resistor 26 and a resistor 48 to the noninverting input terminal 50 of the comparator 24. The input terminals 44 and 50 may be connected through a capacitor 52 and the interconnection of the resistor 48 and the variable resistor 26 may be directly connected to the interconnection of the armature windings of the motor 12 and the resistor 40 of the sensor 14.

The output terminal 46 of the comparator 24 may also be connected to the base electrode of an NPN transistor Q2, the collector electrode of the transistor Q2 being connected to the base electrode of the PNP transistor Q3, the collector electrode of the transistor Q3 being grounded and the emitter electrode of the transistor Q2 being grounded through a resistor 54. The interconnection 56 between the collector electrode of the transistor Q2 and the base electrode of the transistor Q3 may be connected through a Zener diode 58 to the battery voltage $V_B$.

With continued reference to FIG. 7, the base electrode of the transistor Q1 is connected to a center tap of the secondary winding 60 of a transformer, opposite ends of the winding 60 being connected through diodes 62 and 64 to the emitter electrode of the transistor Q1. The emitter electrode of the transistor Q1 may also be connected to the base electrode thereof and thus the center tap of the winding 60 by way of a resistor 66.

The transformer may be a potted core ferrox cube 3019 P-3E or equivalent and may be provided with primary windings 68, 70 and 72. The voltage $V_B$ of the battery 10 of FIG. 1 may be directly connected to the center tap of the winding 70 and the opposite ends thereof connected respectively through NPN transistors Q4 and Q5 to the emitter electrode of the transistor Q3. The interconnection of the emitter electrodes of the transistors Q4 and Q5 may be connected through a diode 74 and a resistor 76 to the battery voltage $V_B$ and the interconnection 78 between the diode 74 and the resistor 76 may be connected to the base electrode of the transistor Q5 through the winding 72 in series with the parallel combination of a resistor 80 and a capacitor 82. The terminal 78 may likewise be connected to the base electrode of the transistor Q4 through the winding 68 and parallel combination of a resistor 84 and a capacitor 86.

Bias for the comparator 24 may be provided by means of a second auxiliary winding 94 on the secondary side of the transformer, one end of the winding 94 being directly grounded and the other end grounded through the series combination of a diode 90 and a capacitor 92 with the bias for the comparator 24 taken across the capacitor 92. The transformer winding 70 may be 14 turns, the windings 60, 68 and 72 one turn each in the embodiment illustrated in FIG. 7.

With continued reference to FIG. 7, the Zener diode 32 provides voltage stabilization for a portion of the voltage divider network comprising the resistor 34 and the potentiometer 20. The tap 22 of the potentiometer 20 provides a speed reference or throttle control signal as explained in connection with the circuit of FIG. 1, and the feedback resistor 26 determines the fixed width of the hysteresis loop irrespective of the throttle setting of the tap 22. The output signal from the comparator 24 is utilized as the output signal of the Schmitt trigger circuit 28 to control the operation of the switch circuit 96 and the Zener diode 58 provides further voltage regulation. The transformer and associated components form a pulse amplifier 100 which in turn controls the conduction of the transistor Q1 as earlier explained in connection with FIG. 1.

Exemplary values for the circuit of FIG. 7 are as follows:

| | |
|---|---|
| resistor 26 | 47K ohms |
| resistor 30 | 1.2K ohms |
| resistor 34 | 10K ohms |
| resistor 40 | 1.3M ohms |
| resistors 42 and 48 | 510 ohms |
| resistor 54 | 180 ohms |
| resistor 66 | 0.5 ohms |
| resistor 76 | 4.7K ohms |
| resistors 80 and 84 | 18 ohms |
| capacitor 52 | 0.01 uf |
| capacitors 82 and 86 | 0.22 uf |
| diodes 74 and 90 | IN 914 |
| Zener diode 32 | 12 volts |
| Zener diode 58 | 16 volts |
| transistor Q2 | MPS 6520 |
| transistor Q3 | 2N 5195 |
| transistors Q4 and Q5 | 2N 5192 |

ADVANTAGES AND SCOPE OF THE INVENTION

As is readily apparent from the foregoing detailed description of a preferred embodiment of the circuit of the present invention, the efficiency of prior controllers is significantly exceeded. By the utilization of the present invention, a motor may be brought up to a desired speed with high efficiency while maintaining the appropriate torque. Moreover, the braking of the traction vehicle reduces the input current to the motor below that of the back e.m.f. thereof and a portion of the resultant current is fed back into the battery as a charging current. Battery life may thus be significantly enhanced. By the use of the method and controller of the present invention, the power losses resulting from the switching of the current controlling transistor are significantly reduced and current multiplication is achieved.

For example, the controller of the present invention may be utilized with the electric bike described and claimed in copending application Ser. No. 381447 filed July 23, 1973 herewith and assigned to the assignee of the present invention. In the bicycle application, the current source may be two 12 volt, 15 ampere-hour batteries and the controller may be operable from 0 to 400 Hz in frequency and from 0 to 100 percent duty cycle. The efficiency of the circuit is such that a human being of average weight may be propelled over level ground under no wind conditions at 12 miles per hour for a distance in excess of 35 miles.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A controller circuit for a traction vehicle comprising:
    a battery;
    an electronic switch having a control terminal;
    a direct current motor;
    a diode;
    circuit means connecting said battery, said electronic switch and said direct current motor in series and connecting said diode in parallel with said motor opposing the flow of direct current from said battery through said electronic switch;
    means for continuously sensing the instantaneous direct current flowing through said motor; and,
    means operatively connected and responsive to said sensing means for controlling the conduction of said electronic switch.

2. The controller circuit of claim 1 wherein said electronic switch conduction controlling means includes a Schmitt trigger circuit.

3. A controller circuit for a traction vehicle comprising:
    a battery;
    an electronic switch having a control terminal;
    a direct current motor;
    a diode;
    circuit means connecting said battery, said electronic switch and said direct current motor in series and connecting said diode in parallel with said motor opposing the flow of direct current from said battery through said electronic switch;
    means for sensing the direct current flowing through said motor; and,
    means operatively connected and responsive to said sensing means for controlling the conduction of said electronic switch, said electronic switch conduction controlling means including:
        a comparator having first and second input terminals and an output terminal,
        means for applying a selected reference signal to said first input terminal,
        means responsive to said sensing means for applying to said second terminal a signal related to the flow of direct current through said motor, and
        impedance means electrically connected between said output terminal and said second input terminal.

4. The controller circuit of claim 3 wherein said electronic switch conduction controlling means includes pulse amplifying means electrically connected between the output terminal of said comparator and the control terminal of said electronic switch.

5. The controller circuit of claim 4 wherein said electronic switch includes a transistor; and,
    wherein said amplifying means includes a transformer.

6. A controller for a traction vehicle comprising:
    a pair of input terminals adapted for electrical connection to a source of direct current;
    a first parallel circuit including a direct current motor and a first diode connected in parallel;
    a second parallel circuit including a transistor having a control terminal and a second diode connected in parallel;
    a potentiometer having a manually positionable tap;
    circuit means for connecting said first and second parallel circuits in series between said pair of input terminals and for connecting said potentiometer between said pair of input terminals in parallel therewith;

means for sensing motor current;

a comparator having two input terminals and an output terminal, one of said two input terminals being connected to said motor current sensing means and the other of said two input terminals being connected to the manually positionable tap of said potentiometer; and, amplifying means connected between the output terminal of said comparator and the control terminal of said transistor.

7. The controller of claim 6 wherein said amplifying means includes a transformer.

8. The controller of claim 6 further including a Zener diode connected in parallel with said potentiometer.

9. A controller comprising:

an electronic switch adapted to be connected between a source of direct current and the windings of a direct current motor;

means for continuously sensing the instantaneous current through said direct current motor; and, means responsive to said sensing means for controlling the conduction of said electronic switch to maintain said motor current within predetermined limits.

10. A method of controlling a direct current motor compring the steps of:

a. establishing upper and lower predetermined limits for current through the direct current motor;

b. sensing the current in the direct current motor; and, c. controlling the application of a predetermined substantially constant voltage to said motor by initiating the application of the voltage responsively to the existance of a predetermined relationship between the motor current sensed and the lower predetermined limit and by terminating the application of the voltage responsively to the existence of a predetermined relationship between the sensed motor current and the upper predetermined limit.

11. A method of controlling the current applied to a direct current motor of a traction vehicle comprising the steps of:

a. providing a first signal related to a desired vehicle speed;

b. providing a second signal related to motor current;

c. comparing the first and second signals; and, d. applying a substantially constant voltage to said motor during a succession of time intervals each initiated responsively to the existence of a first predetermined relationship between the first and second signals and each terminated responsively to the existence of a second predetermined relationship between the first and second signals.

* * * * *